Aug. 16, 1932.     H. D. JAMES     1,871,697
CONTROL SYSTEM
Filed March 19, 1929     2 Sheets-Sheet 1

INVENTOR
Henry D. James.
BY
ATTORNEY

Aug. 16, 1932.  H. D. JAMES  1,871,697
CONTROL SYSTEM
Filed March 19, 1929   2 Sheets-Sheet 2

INVENTOR
Henry D. James.
BY
ATTORNEY

Patented Aug. 16, 1932

1,871,697

UNITED STATES PATENT OFFICE

HENRY D. JAMES, OF SWISSVALE, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed March 19, 1929. Serial No. 348,269.

My invention relates to control systems for accelerating electric motors.

An object of my invention is to provide a control system for accelerating electric motors that shall be simple in construction and efficient in its operation.

Another object of the invention is to obtain time-delay acceleration for motors.

A further object of the invention is to control the acceleration of motors in accordance with changes in the impedance of a variable reactor.

A still further object of the invention is to provide for varying the impedance of a reactor, disposed to control the acceleration of motors in accordance with the speed of the motors.

Other objects and advantages of the invention will be apparent to those skilled in the art from the following description taken in conjunction with the accompanying drawings in which, Figure 1 is a schematic illustration of circuits and apparatus arranged in accordance with the invention and disposed to control the operation of direct-current motors.

Figure 1:
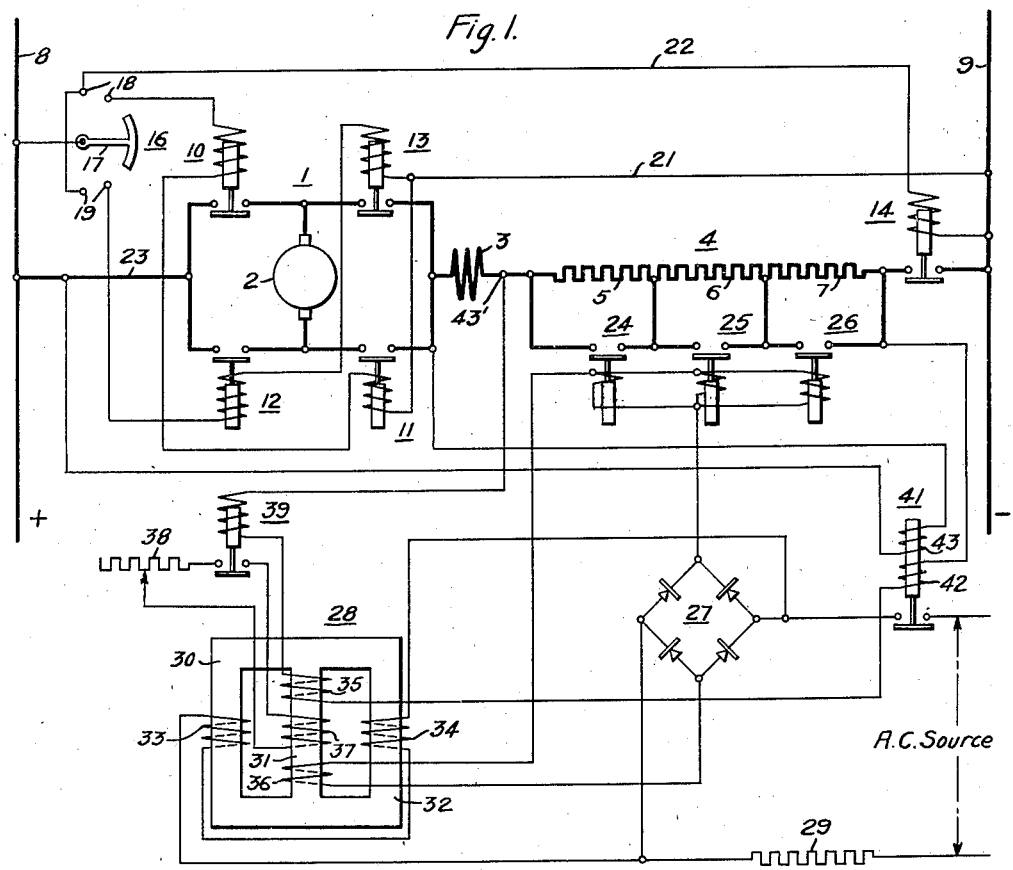

In Fig. 1 of the drawings, a direct-current series motor 1 is illustrated as comprising an armature 2 and a series field winding 3. In order to limit the current flow through the motor during the starting period, an accelerating resistor 4, comprising sections 5, 6 and 7, is provided and disposed to be connected in series-circuit relation with the armature 2 and field winding 3 when the motor is connected to power-supply conductors 8 and 9.

The motor 2 may be connected to the supply conductors 8 and 9 by means of reversing switches 10, 11, 12 and 13, and a line switch 14.

In order to selectively energize the reversing switches and thereby control the direction of operation of the motor 1 and also energize the line switch 14, a master switch 16 is provided. The master switch 16 comprises a movable contact member 17 and stationary contact fingers 18 and 19.

When the movable contact member 17 of the switch 16 is actuated to bridge the contact fingers 18, energizing circuits for the actuating coils of the reversing switches 10 and 11 and the line switch 14 are established. The energizing circuit for the actuating coils of the switches 10 and 11 extends from the positively energized supply conductor 8, the movable contact member 17, contact finger 18, actuating coils of switches 10 and 11 and conductor 21 to the negatively energized supply conductor 9.

The energizing circuit for the switch 14 extends from the positively energized conductor 8, through the movable contact member 17, contact finger 18, conductor 22 and the actuating coil of the switch 14, to the negatively energized supply conductor 9.

When the reversing switches 10 and 11 and the line switch 14 are closed, a motor circuit is established which extends from the positively energized conductor 8, through conductor 23, the contact members of switch 10, the motor armature 2, the contact members of switch 11, the field winding 3, resistor 4 and the contact members of the line switch 14, to the negatively energized supply conductor 9.

In order to accelerate the motor to its full running speed, accelerating switches 24, 25 and 26 are provided for short-circuiting the sections 5, 6, and 7 of the resistor 4 in a predetermined sequence. As shown, the actuating coils of the switches 24, 25, and 26 are connected in parallel-circuit relation.

Figure 2:
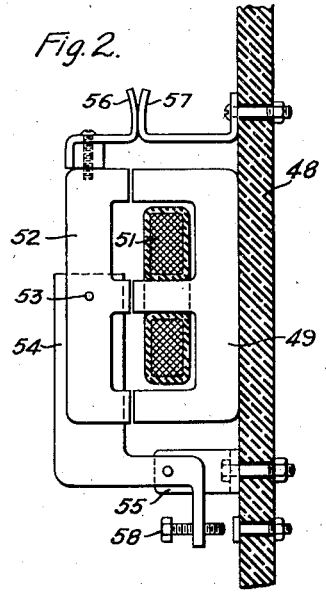
Fig. 2 is a view, partially in section and partially in side elevation, of an electromagnetic switch that may be adjusted to operate when a current of a predetermined value traverses its actuating coil.

The switches 24 to 26, inclusive, may be of the type illustrated in Fig. 2 of the drawings. The air-gaps in the magnetic circuits of these switches may be so adjusted that they will close in succession, according as the value of current supplied to the actuating coils is increased in predetermined steps.

In order to actuate the switches 24 to 26, inclusive, in a predetermined sequence, a rectifier 27 and a variable reactor 28 are provided. As shown, the rectifier 27 is of the double-wave type and is connected in series-circuit relation with a resistor 29 across a suitable source of alternating current, preferably of constant voltage. The unidirectional current output of the rectifier 27 is dependent upon the voltage drop across the resistor 29, and the value of the voltage drop is dependent upon the value of the impedance of the reactor 28.

The reactor 28 comprises a core having legs 30, 31 and 32. The outer legs 30 and 32 are provided with alternating-current coils 33 and 34 that are connected in series-circuit relation to each other and in parallel-circuit relation to the rectifier 27 across the source of alternating-current power.

In order to vary the impedance of the reactor 28, as the speed of the motor increases, the middle leg 31 is provided with direct-current coils 35 and 36, whereby direct-current magnetic flux may be caused to saturate, more or less, the middle leg 31 of the core, depending on the total magnetic effect of coils 35 and 36. As shown, the coil 35 is connected across the starting resistor 4 and will, therefore, be energized by direct current in accordance with the voltage drop across the resistor. The current in the coil 35 will, therefore, vary as the speed of the motor varies.

The coil 36 is connected in series relation with the actuating coils of the switches 24, 25, and 26, across the rectifier 27 and will, therefore, be supplied with direct current, the value of which will be dependent upon the direct-current output of the rectifier. As will be described hereinafter, the output of the rectifier varies as the impedance of the reactor varies.

Figure 3:
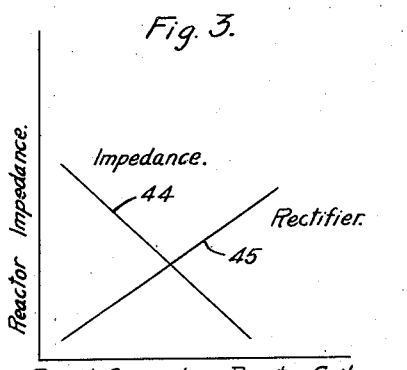
Fig. 3 represents graphically the impedance-current characteristics of a variable reactor embodied in the circuits and apparatus arranged in accordance with the invention.

When the coils 35 and 36 are deenergized, the impedance of the reactor will be a maximum, as indicated graphically in Fig. 3 of the drawings.

In Fig. 3 of the drawings, curve 44 represents variations of impedance of the reactor corresponding to variations of current in the coils 35 and 36, and curve 45 represents variations of unidirectional-circuit output of the rectifier 27 corresponding to the variations of the impedance of the reactor. As will be observed from Fig. 3 of the drawings, the impedance of the reactor decreases as the direct current in the coils 35 and 36 increases, and that the unidirectional-current output of the rectifier increases as the impedance of the reactor increases.

In order to prevent sudden changes of current in the coils 35 and 36, and thereby cause a time interval to intervene between the closing of the respective switches 24, 25 and 26, a damping coil 37 is disposed on the middle leg 31. In order to adjust the time interval intervening between the closing of the switches, a variable resistor 38 is connected in series-circuit relation with the damping coil 37. A closed circuit for the damping coil 37 may be established by means of a relay 39 which is closed while the motor is accelerating.

When one of the accelerating relays, say 24, operates to shunt one of the resistor sections, as 5, of the resistor 4, the voltage impressed on coil 35 is suddenly decreased. The damping coil 37 prevents a too rapid current decay in coil 35 and, in consequence, the change of impedance of the reactor 28 is retarded by the coil 37, and the retarding period is adjusted by the resistor 38. The time interval between successive operation of the accelerating relays 24, 25 and 26 is thus determined by the adjustment of the rheostat 38.

In order that the coils 33 and 34 of the reactor and the rectifier 27 may be connected across the source of alternating-current supply when the motor has been connected across the supply conductors 8 and 9, a switch 41 is provided.

The switch 41 is provided with an actuating coil 42 that is connected across the resistor 4 and is disposed to close the switch 41 when the motor circuit is established. In order that the switch 41 may be held closed, after the resistor 4 is short-circuited and the motor is operating at full voltage, a coil 43 is provided. As shown, the coil 43 is connected across the armature 2 of the motor and is therefore, energized in accordance with the counter electromotive force developed in the armature 2. The switch 41 will, therefore, remain closed while the motor is operating, even though the coil 42 is deenergized.

It is to be observed, also, that, when the power supply of the motor is reversed, the coil 43 of the switch 41 will be completely deenergized because the counter-voltage of the motor will pass through zero value before it reverses with reference to its polarity.

It is to be observed that the coil 42 of the switch 41 is connected in series-circuit relation with the actuating coil of the switch 39 and the direct-current coil 35, and the direct-current coil 35 is disposed on the middle leg 31 of the reactor.

Assuming that the reversing switches 10 and 11 and line switch 14 have been closed, in the manner stated above, an energizing circuit for the coil 42 of the switch 41, the actuating coil of switch 39 and the direct-current reactor coil 35 is established because of voltage across the resistor 4. This circuit extends from junction point 43', through the actuating coil of the switch 39, coil 35, the actuating coil 42 of switch 41, and the contact members of the line switch 14, to the negatively energized conductor 9, to effect the closure of switches 39 and 41. It will be observed that the current flowing in the circuit including the reactor coil 35 is dependent upon the voltage across the resistor 4.

When the switch 39 is closed, a circuit is established for the damping coil 37 of the reactor 28 that extends through the resistor 38, the contact members of the relay or switch and the coil 37. The current in the coil 37 will, therefore, be dependent upon the resistor 38 and the variations of flux in the leg 31.

When the switch 41 is closed, the rectifier 27 and the coils 33 and 34 of the reactor 28 are connected in series-circuit relation with the resistor 29 across the source of alternating-current supply.

When the rectifier 27 is connected across the source of alternating-current supply, unidirectional current will be supplied to the circuit including the actuating coils of the accelerating switches 24, 25 and 26 and the direct-current reactor coil 36. The value of the unidirectional current supplied will be dependent upon, or be proportional to, the voltage drop across the resistor 29. Since the voltage drop across the resistor 29 is partly dependent upon the current in the alternating-current coils 33 and 34 of the reactor 28—the coils being connected in parallel-circuit relation to the rectifier 27—the voltage drop, and, consequently the unidirectional-current output of the rectifier will vary with changes in the impedance of the reactor 28. It has been shown that the impedance of the reactor varies substantially inversely as the voltage drop across the starting resistor 4 varies; therefore, it follows that the impedance of the reactor 28 varies substantially directly as the speed of the motor varies during the period of acceleration.

Since the voltage drop across the resistor 4 is of a maximum value the moment that power is applied to the motor and decreases as the motor speed increases, the current in the coils 35 and 36 will be of a relatively high value upon the initial establishment of the motor circuit. Therefore, the impedance of the reactor 28 will be of a relatively low value and, consequently, alternating current of a relatively high value will flow through the alternating-current coils 33 and 34 of the reactor. Because the alternating current in the coils 33 and 34 is of a high value, the voltage drop across the resistor 29 will be relatively high. Since the voltage drop across the resistor 29 is high, a voltage of a relatively low value will be impressed upon the rectifier 27. Therefore, the moment the alternating-current coils 33 and 34 of the reactor 28 are energized, the unidirectional current output of the rectifier 27 to the actuating coils of the switches 24, 25 and 26, which coils are connected in parallel-circuit relation, will be of a relatively low value.

The switch 24 may be so adjusted that it will close responsive to the relatively low value of unidirectional-current output of the rectifier. When the switch 24 is closed, section 5 of the resistor 4 is shunted, and the voltage impressed across the motor 2 will increase, thereby accelerating the motor. As is well known, the moment the voltage impressed on a motor is increased, a momentary increase in current will result. However, the momentary increase in motor current does not affect the impedance-reactor 28 because sudden changes of current in the coil 35 is prevented by reason of damping coil 37.

When the speed of the motor 2 has reached a value corresponding to the increase in voltage effected by the bridging or shunting of section 5 of the resistor 4, the current through the coil 35 of the reactor will decrease to a value determined by the voltage drop across sections 6 and 7 of the resistor 4. The length of time required to effect this decrease in current will be dependent upon the damping effect of the coil 37. The impedance of the reactor 28 will, therefore, increase, causing the current in the alternating-current coils 33 and 34 to decrease.

Since the current in the coils 33 and 34 is decreased, the voltage drop across the resistor 29 will decrease also, and, accordingly, the voltage impressed upon the rectifier 27 will increase. Since the voltage impressed upon the rectifier 27 is increased, responsive to the closing of the accelerating switch 24, the unidirectional-current output of the rectifier will also increase and cause the switch 25 to close. When the switch 25 is closed, section 6 of the accelerating resistor 4 will be shunted.

When the switch 25 closes, the voltage impressed on the motor 2 is increased to effect an increase in the speed of the motor. Since sections 5 and 6 of the resistor 4 are shunted, the voltage impressed upon the coil 35 of the reactor 28 will be proportional to the relatively low voltage drop across the section 7 of the resistor 4. It will, therefore, be apparent that only a current of low value will flow through the coil 35. However, the decrease of current in the coil 35 will be retarded by the damping effect of the short-circuited coil 37. When the current flowing in the coil 35 has reached a value that is proportional to the voltage drop across section 7 of the resistor 4, the impedance of the reactor 28 will be increased in proportion to the decrease of current in the coil 35 of the reactor.

Since the impedance of the reactor 28 is increased, the current in the resistor 29 will be decreased, therefore, the alternating-current voltage impressed on the rectifier 27 will be increased to increase its unidirectional-current output. Since the unidirectional-current output of the rectfier 27 is increased, the coil of the switch 26 will be sufficiently energized to effect the closure of the latter. When the switch 26 is closed, the section 7 of the resistor 4 is shunted, and the motor will operate at full voltage and at full running speed.

When sections 5, 6 and 7 are short-circuited, the entire resistor 4 is shunted, and the voltage drop across the coil 42 of the switch 41, the actuating coil of the switch 39 and the coil 35 will be substantially zero. Therefore, the switch 39 will open to interrupt the energizing circuit of the coil 37. Since the direct-current coil 35 is deenergized, the voltage drop across the resistor 29 will be reduced to a value determined by the unidirectional-current output of the rectifier 27. Therefore, the rectifier 27 will be supplied with a maximum voltage and, accordingly, its unidirectional-current output will be a maximum. When the current output of the rectifier is a maximum, the coils of the switches 24, 25 and 26 will be sufficiently energized to maintain them in their circuit-closing positions.

As stated hereinbefore, the switches 24, 25 and 26 may be of the type shown in Fig. 2 of the drawings. The particular switch shown in Fig. 2 comprises a base 48 of insulating material on which is mounted a stationary core 49 of substantially E-shape. An actuating coil 51 is disposed on the middle leg of the core 49. Associated with the core 49 is an armature 52 of substantially E-shape. As shown, the armature 52 is pivotally mounted at 53 on a bracket 54, the bracket being pivotally secured to a supporting member 55 which is secured to the base 48.

At the upper end of the armature 52, a contact member 56 is mounted and disposed to engage a stationary contact member 57 carried by the base 48 when the coil 51 is energized.

In order that the airgaps between the armature 52 and the core 49 may be so adjusted that the contact members 56 and 57 will close when a pre-selected value of current traverses the coil 51, an adjusting screw 58 is provided. As may be observed from the drawings, the screw 58 is disposed to abut against the base 48 when the switch is in its open-circuit position. By adjusting the screw 58, the airgap between the armature 52 and the stationary core 49, with reference to the open-circuit position of the switch, may be adjusted. Therefore, if the clearance between the end of the screw 58 and the base 48 is made small to provide a short air gap between the armature 52 and the core 49, only a relatively small value of current in the coil 51 will be required to close the contact members of the switch. If the clearance is made larger, to provide a longer air gap, a higher value of current is required to close the switch contact members.

Since the actuating coils of the switches 24, 25 and 26 are connected in parallel-circuit relation, it is to be understood that the air gaps between the armature 52 and the stationary core 49 of the respective switches will be so adjusted that the switch 24 will close when a current of relatively small value flows; the switch 25 will close, when a current of a larger value flows; and the switch 26 will close, when a current of still larger value flows. Therefore, it will be understood, that the switches 24 to 26, inclusive, will close in succession, according as the current in the parallel circuit comprising the actuating coils of the switches increases, step by step, in response to corresponding variations of impedance of the reactor 28.

Figure 4:
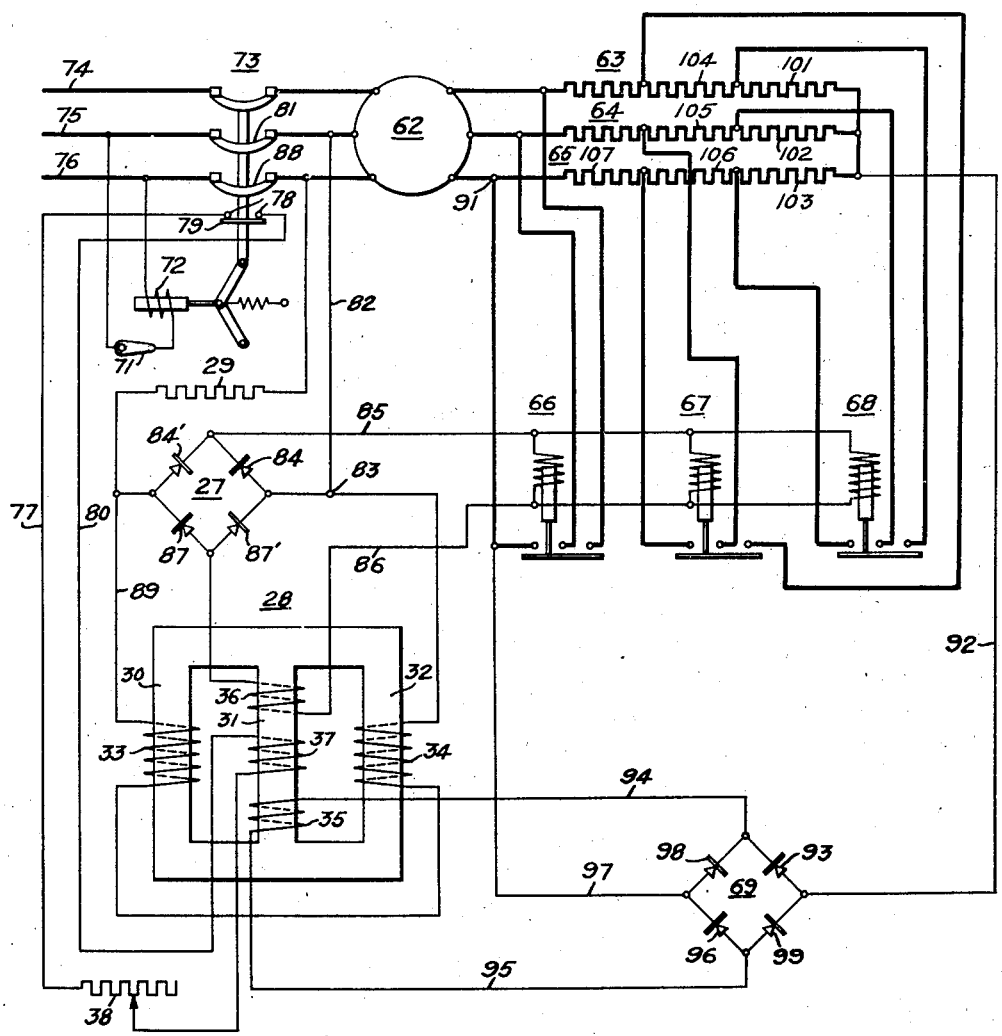
Fig. 4 is a diagram of the modification of the circuits and apparatus shown in Fig. 1, as applied to the control of alternating-current motors.

In Fig. 4 of the drawings, the variable reactor 28 is illustrated as being utilized to effect time-delay acceleration of an alternating-current motor 62. The motor 62 may be considered, for purposes of illustration, to be a 3-phase wound-rotor induction motor. For starting purposes, a plurality of resistors 63, 64 and 65 are utilized to limit the current flow through the motor during its accelerating period and are connected in star-circuit relation.

To effect acceleration of the motor 62, accelerating switches 66, 67 and 68 are provided for short-circuiting or bridging sections of the respective resistors 63, 64 and 65. The actuating coils of the switches 66, 67 and 68 are connected in parallel-circuit relation to each other and in series-circuit relation with the coil 36 of the reactor 28, (as in Fig. 1), across the unidirectional current output terminals of the rectifier 27. The switches 66 to 68, inclusive, may be of the type illustrated in Fig. 2 and are, therefore, adjustable to operate at different currents of predetermined values. Accordingly, the switches will close in a predetermined sequence according as the unidirectional-current output of the rectifier 27 increases in response to increases in the impedance of the reactor 28.

The coil 35 of the reactor 28 is energized in accordance with the voltage drop across the resistor 65, in the same manner as it is energized by the voltage drop across the resistor 4 of Fig. 1. But, as the coil 35 is disposed to be energized by direct current, in order that the reactor 28 shall function in accordance with the invention, a rectifier 69 is provided for energizing the coil 35 with unidirectional current. The current output of the rectifier 69 will vary as the alternating-current voltage drop across the resistor 65 varies. As shown, the rectifier 69 is of the double-wave type.

In order to start the motor 62, a switch 71 may be closed, whereby the actuating coil 72 of a toggle-switch mechanism 73 is energized to close the contact members of the switch mechanism and thereby connect the motor 62 across the alternating-current supply conductors 74, 75 and 76. When the switch mechanism 73 has closed, a motor circuit is established for the motor 62, and current will flow in the resistors 63, 64 and 65 in accordance with the slip of the motor 62.

Simultaneously with the closing of the switch mechanism 73, a closed circuit is established for the coil 37, disposed on the middle leg 31 of the reactor 28, which extends from the coil 37, through the resistor 38, conductor 77, contact fingers 78—bridged by contact segment 79 of the switch mechanism 73—and conductor 80, back to the coil 37. When a closed circuit is established for the coil 37, sudden changes in value of the direct current in the coils 35 and 36 will be prevented, thereby causing a time delay between the closing of the respective switches 66, 67 and 68. The time-delay element of the reactor 28 may be controlled by adjusting the variable resistor 38.

When the switch mechanism 73 has been closed, a circuit may be traced which extends from supply conductor 75 through a contact member 81 of the switch 73, conductor 82, junction point 83, through element 84 of the rectifier 27, conductor 85, the actuating coils of the switches 66, 67 and 68 connected in parallel, conductor 86, coil 36 of the reactor 28, rectifier element 87, resistor 29 and contact member 88, to the supply conductor 76. When the alternating current reverses, current will flow, through the rectifier elements 84' and 87', to the coils of the switches 66, 67, and 68 and the coil 36. Another circuit may be traced which extends from the junction point 83, through the alternating-current coils 34 and 33, conductor 89, resistor 29 and contact member 88, to the supply conductor 76.

The circuit established for the rectifier 69 extends from a junction point 91, through resistor 65, conductor 92, element 93 of the rectifier 69, conductor 94, the direct-current coil 35 of the reactor 28, conductor 95, rectifier element 96 and conductor 97, to the junction point 91. When the current in the resistor 65 reverses, current flows through the coil 35 from the conductor 97, through rectifier element 98, conductor 94, the coil 35, conductor 95, rectifier element 99 and conductor 92, back to the resistor 65.

Since the coils 35 and 36 are energized with direct current, the impedance of the reactor 28 will be relatively low, therefore, a current of relatively high value will flow through the alternating-current coils 33 and 34, since the coils 33 and 34 are connected in parallel-circuit relation to the rectifier 27 across the supply conductors 75 and 76.

The voltage drop across the resistor 29 will, therefore, be of a high value, consequently, the alternating-current voltage impressed on the rectifier 27 will be relatively low. Accordingly, the unidirectional current in the output circuit of the rectifier will be of a low value. However, the switch 68 may be so adjusted that it will close in response to this value of current. When the switch 68 is closed, sections 101, 102 and 103 of the respective resistors 63, 64 and 65 will be shunted thereby reducing the slip in the motor 62 and causing it to increase its speed.

Since sections 101 to 103, inclusive, of the resistors 63 to 64, inclusive, are short-circuited, the alternating-current voltage impressed on the rectifier 69 will be decreased, thereby decreasing the current which flows in the coil 35 of the reactor 28. The impedance of the reactor will, therefore, be increased by an amount corresponding to the reduction in the direct current in the coil 35. Since the impedance of the reactor 28 will increase and, as the coils 33 and 34 of the reactor are connected in parallel with the rectifier 27, the value of alternating current in the resistor 29 will be decreased. Since the alternating current flowing in the resistor 29 is decreased, the voltage drop is decreased proportionately, and an increase in the voltage impressed on the rectifier 27 is effected, and, in consequence, more current will flow in the coil 36. This increase in current will cause the switch 67 to close, and sections 104, 105 and 106 of the respective resistors 63, 64 and 65 will be short-circuited. The resistance of the rotor circuit of the motor is thereby decreased, which will result in a decrease in the motor slip and an increase of speed.

When the switch 67 is closed, the alternating-current voltage impressed on the rectifier 69 is only equal to the voltage drop across the remaining section 107 of the resistor 65. This voltage drop will obviously be quite small, so that the direct current in the coil 35 will be decreased to a value depending upon the voltage drop across the section 107. The impedance of the reactor 28 will, therefore, be increased in proportion to the reduction of current in the coil 35. This increase in impedance, as stated hereinbefore, will result in a higher alternating-current voltage being impressed on the rectifier 27. Therefore, a greater unidirectional-current output of the circuit of the rectifier 27 will result, and the switch 66 will be actuated to its closed position.

When the switch 66 is closed, all of the sections of the respective resistors 63, 64 and 65 will be shunted, and the motor 62 will operate at its full running speed.

It is, therefore, to be observed that the alternating-current voltage impressed upon the rectifier 69 will be substantially zero, and the coil 35 will be deenergized. Since the coil 35 is deenergized, the impedance of the reactor will increase to a value determined by the value of current flowing in the coil 36. Under these conditions, the impedance of the reactor is a maximum, and sufficient current will be supplied to the actuating coils of the switches 66, 67 and 68 to maintain them closed. The motor will now operate at its full running speed.

It is to be observed that the damping coil 37 functions to so delay changes in the impedance of the reactor 28 that a time interval will intervene between the closing of the line switch 73, and the closing of the accelerating switch 68, the accelerating switches 68 and 67 and the switches 67 and 66. As previously stated herein, the time interval may be adjusted by changing the resistance in the circuit of the damping coil 37 by means of the variable resistor 38.

Various modifications may be made in the circuits and apparatus herein disclosed without departing from the spirit and scope of the invention. It is desired, therefore, that the invention, as disclosed, shall be interpreted in an illustrative and not in a limiting sense.

I claim as my invention:

1. In a motor-control system, in combination, a motor, an accelerating resistor, a plurality of switches, magnet coils for actuating said switches, said switches being disposed to shunt sections of said resistor in a predetermined sequence, a source of alternating-current power, a rectifier disposed to rectify the current from the alternating-current source of power and to supply unidirectional current to said magnet coils, a resistor connected in series circuit relation with said rectifier, and a variable reactor connected in parallel-circuit relation to said rectifier.

2. In a motor-control system, in combination, a motor, an accelerating resistor, a plurality of switches, magnet coils for actuating said switches, said switches being disposed to shunt sections of said resistor in a predetermined sequence, a source of alternating-current power, a rectifier interposed between said alternating-current source of power and said magnet coils to rectify the current, a resistor connected in series circuit relation with said rectifier, a variable reactor connected in parallel-circuit relation to said rectifier, and means for varying the impedance of said reactor in accordance with the motor current.

3. A plurality of switches provided with magnet coils connected in parallel and disposed to be closed in succession in response to successive increases in current, an alternating-current source of power, a rectifier connected thereto and disposed to supply unidirectional current to said magnet coils, an alternating-current circuit connected in parallel-circuit relation to said rectifier and across said source of power, and means for varying the impedance of said alternating-current circuit in steps to thereby effect corresponding variations of unidirectional current through said rectifier and said magnet coils.

4. In a motor-starting device, in combination, a motor, a resistor, means for connecting the resistor in circuit relation with the motor when the motor is started, a plurality of switches for bridging sections of said resistors, said switches being provided with magnet coils, and means disposed to actuate said switches in a predetermined sequence comprising a rectifier for supplying unidirectional current to said magnet coils, a source of alternating-current power connected to said rectifier, a variable reactor connected in parallel-circuit relation to said rectifier, and means for varying the impedance of said reactor in accordance with the voltage-drop across said resistor, whereby the unidirectional current of said rectifier may be caused to vary in accordance with the variations in the impedance of said reactor.

5. In a motor-control system, in combination, a motor, a starting resistor for said motor, a plurality of switches, each provided with magnet coils, said coils being disposed to actuate the respective switches at different currents of predetermined values, rectifier connected in parallel-circuit relation to said magnet coils for energizing said coils by unidirectional current, a source of alternating current for said rectifier, and a variable reactor connected in parallel-circuit relation to said rectifier and across said source of alternating-current power, said reactor being disposed to vary the unidirectional current output of said rectifier.

6. In a motor-control system, in combination, a motor, a starting resistor for said motor, a plurality of switches, each provided with magnet coils, said coils being disposed to actuate the respective switches at different currents of predetermined values, a rectifier connected in parallel-circuit relation to said magnet coils for energizing said coils by unidirectional current, a source of alternating-current power for said rectifier, a reactor connected in parallel-circuit relation to said rectifier and across said source of alternating-current power, and means disposed to vary the impedance of said reactor in accordance with the voltage-drop across said starting resistor, whereby the unidirectional-current output of said rectifier may be varied to cause said magnet coils to actuate the respective switches in a predetermined sequence.

7. In a motor-control system, in combination, a motor, a starting resistor, for said motor, a plurality of switches, each provided with magnet coils, said coils being disposed to actuate the respective switches at different currents of predetermined values, a rectifier connected in parallel-circuit relation to said magnet coils for energizing said coils by unidirectional current, a source of alternating current for said rectifier, a reactor connected in parallel-circuit relation to said rectifier and across said source of alternating-current power, means disposed to vary the impedance of said reactor in accordance with the voltage-drop across said starting resistor, whereby the unidirectional-current output of said rectifier may be varied to cause said magnet coils to actuate the respective switches in a predetermined sequence, and means disposed to energize said reactor-impedance-varying means after the motor has started.

8. In a motor-control system, in combination, a motor, a starting resistor for said motor, a plurality of switches, each provided with magnet coils, said coils being disposed to actuate the respective switches at different currents of predetermined values, a rectifier connected in parallel-circuit relation to said magnet coils for energizing said coils by unidirectional current, a source of alternating current for said rectifier, a reactor connected in parallel-circuit relation to said rectifier and across said source of alternating-current power, means disposed to vary the impedance of said reactor in accordance with the voltage-drop across said starting resistor, whereby the unidirectional-current output of said rectifier may be varied to cause said magnet coils to actuate the respective switches in a predetermined sequence, and means associated with said reactor and disposed to prevent sudden changes in the impedance of said reactor.

In testimony whereof, I have hereunto subscribed my name this 11th day of March, 1929.

HENRY D. JAMES.